United States Patent
Wong et al.

(10) Patent No.: US 12,461,020 B2
(45) Date of Patent: Nov. 4, 2025

(54) HYBRID OPTICAL PARAMETRICALLY-OSCILLATING EMITTER

(71) Applicants: VERSITECH LIMITED, Hong Kong (CN); ADVANCED BIOMEDICAL INSTRUMENTATION CENTRE LIMITED, Hong Kong (CN)

(72) Inventors: Kenneth Kin Yip Wong, Hong Kong (CN); Jiawei Shi, Hong Kong (CN); Mingsheng Li, Boston, MA (US); Jiqiang Kang, Hong Kong (CN)

(73) Assignees: VERSITECH LIMITED, Hong Kong (CN); ADVANCED BIOMEDICAL INSTRUMENTATION CENTRE LIMITED, Hong Kong (CN)

( * ) Notice: Subject to any disclaimer, the term of this patent is extended or adjusted under 35 U.S.C. 154(b) by 374 days.

(21) Appl. No.: 18/082,739

(22) Filed: Dec. 16, 2022

(65) Prior Publication Data

US 2023/0194412 A1   Jun. 22, 2023

Related U.S. Application Data

(60) Provisional application No. 63/290,499, filed on Dec. 16, 2021.

(51) Int. Cl.
*H01S 3/067*  (2006.01)
*G01N 21/17*  (2006.01)
(Continued)

(52) U.S. Cl.
CPC ..... *G01N 21/1702* (2013.01); *G01N 33/4833* (2013.01); *G02F 1/395* (2013.01);
(Continued)

(58) Field of Classification Search
CPC .......... G01N 21/1702; G01N 33/4833; G01N 2021/1706; G01N 2201/06113;
(Continued)

(56) References Cited

U.S. PATENT DOCUMENTS 7,697,794 B2 * 4/2010 Dragic ................ H01S 3/06708
359/305
8,599,476 B1 * 12/2013 Kozlov ..................... G02F 1/39
372/6
(Continued)

OTHER PUBLICATIONS

J. Tian and W. D. Philpot, "Relationship between surface soil water content, evaporation rate, and water absorption band depths in SWIR reflectance spectra," Remote Sensing of Environment, (2015), 169, pp. 280-289.
(Continued)

*Primary Examiner* — David J Bolduc
(74) *Attorney, Agent, or Firm* — Leason Ellis LLP

(57) ABSTRACT

An optical-resolution photoacoustic microscopy (OR-PAM) system for visualizing water content deep in biological tissue uses an all-fiber 1930-nm hybrid optical parametrically-oscillating emitter. The emitter includes a tunable laser source whose output is amplified by a first erbium-doped fiber amplifier (EDFA). The output of the first amplifier is modulated with a Mach-Zehnder amplitude modulator that receives an RF signal with a nanosecond pulse width and a multiple kilohertz repetition rate. A second EDFA further amplifies the signal and passes it to a fiber circulator that in turn delivers it to a 1950/1550 mm fiber wavelength-division-multiplexing coupler WDM. The coupler introduces the signal to a cavity that includes a spool of highly nonlinear fiber and a Thulium-doped fiber amplifier TDFA. From the TDFA the signal reaches a 50/50 fiber coupler that sends part to a second output TDFA and guides part back to the cavity through a port of the WDM.

17 Claims, 4 Drawing Sheets
(4 of 4 Drawing Sheet(s) Filed in Color)

(51) Int. Cl.

| | |
|---|---|
| G01N 33/483 | (2006.01) |
| G02F 1/39 | (2006.01) |
| H01S 3/00 | (2006.01) |
| H01S 3/094 | (2006.01) |
| H01S 3/10 | (2006.01) |
| H01S 3/108 | (2006.01) |
| H01S 3/16 | (2006.01) |
| H01S 3/23 | (2006.01) |
| H03F 3/19 | (2006.01) |

(52) U.S. Cl.
CPC .......... *H01S 3/005* (2013.01); *H01S 3/06716* (2013.01); *H01S 3/06791* (2013.01); *H01S 3/094015* (2013.01); *H01S 3/1003* (2013.01); *H01S 3/10038* (2013.01); *H01S 3/1083* (2013.01); *H01S 3/1608* (2013.01); *H01S 3/1616* (2013.01); *H01S 3/2316* (2013.01); *H03F 3/19* (2013.01); *G01N 2021/1706* (2013.01); *G01N 2201/06113* (2013.01); *G01N 2201/0633* (2013.01); *G01N 2201/08* (2013.01); *G01N 2201/103* (2013.01); *H03F 2200/294* (2013.01); *H03F 2200/451* (2013.01)

(58) Field of Classification Search
CPC ....... G01N 2201/0633; G01N 2201/08; G01N 2201/103; G01N 21/01; G02F 1/395; G02F 1/39; H01S 3/005; H01S 3/06716; H01S 3/06791; H01S 3/094015; H01S 3/1003; H01S 3/10038; H01S 3/1083; H01S 3/1608; H01S 3/1616; H01S 3/2316; H01S 3/0092; H01S 3/06758; H03F 3/19; H03F 2200/294; H03F 2200/451

See application file for complete search history.

(56) References Cited

U.S. PATENT DOCUMENTS

| | | | | |
|---|---|---|---|---|
| 8,792,156 B1* | 7/2014 | Kieu | .................... | G02B 21/16 359/326 |
| 8,942,556 B2* | 1/2015 | Zhao | .................... | H04B 10/40 398/21 |
| 9,634,454 B1* | 4/2017 | Kieu | .................. | G02B 27/1006 |
| 12,029,490 B2* | 7/2024 | Zhang | .................. | A61B 5/7225 |
| 2008/0037595 A1* | 2/2008 | Gankkhanov | ............ | G01J 3/10 372/3 |
| 2008/0255433 A1 | 10/2008 | Prough et al. | | |
| 2010/0046039 A1* | 2/2010 | Xie | ........................... | G01J 3/44 356/301 |
| 2010/0268042 A1* | 10/2010 | Wang | ................. | A61B 5/14546 73/587 |
| 2014/0177237 A1* | 6/2014 | Welford | ............... | A61B 5/0073 362/317 |
| 2014/0285873 A1* | 9/2014 | Kieu | ....................... | G02F 1/353 359/328 |
| 2014/0356897 A1* | 12/2014 | Wang | ..................... | G01N 21/33 600/407 |
| 2016/0113507 A1* | 4/2016 | Reza | .................. | G01N 21/1702 356/450 |
| 2016/0305914 A1* | 10/2016 | Wang | .................... | G02B 21/002 |
| 2016/0365697 A1* | 12/2016 | Hori | ...................... | H01S 3/1106 |
| 2020/0073103 A1* | 3/2020 | Wang | ................. | G01N 21/1702 |
| 2020/0112138 A1* | 4/2020 | Fendel | ..................... | G02F 1/39 |
| 2020/0251878 A1* | 8/2020 | Kafka | .................. | H01S 3/0085 |
| 2020/0281477 A1* | 9/2020 | Islam | .................. | G01N 33/025 |
| 2020/0288982 A1* | 9/2020 | Islam | ................ | A61B 5/14532 |
| 2021/0141285 A1* | 5/2021 | Marandi | ............... | G02F 1/3501 |
| 2022/0228987 A1* | 7/2022 | Boppart | ............. | G01N 15/1459 |
| 2022/0255285 A1* | 8/2022 | Nicholson | ......... | H01S 3/094046 |
| 2023/0048286 A1* | 2/2023 | Vetrovec | ................. | G02F 1/354 |
| 2023/0075435 A1* | 3/2023 | Saito | .................. | H01S 3/10061 |
| 2025/0055242 A1* | 2/2025 | Limpert | ................ | H01S 3/0057 |

OTHER PUBLICATIONS

Z. Xu, Q. Zhu, and L. V. Wang, "In vivo photoacoustic tomography of mouse cerebral edema induced by cold injury," Journal of Biomedical Optics, (2011), 16, pp. 066020-1-066020-4.

Z. Xu, C. Li, and L. V. Wang, "Photoacoustic tomography of water in phantoms and tissue," Journal of Biomedical Optics, (May/Jun. 2010), 15(3), pp. 036019-1-036019-6.

Freudiger, C. W et al. Label-free biomedical imaging with high sensitivity by stimulated Raman scattering microscopy. Science, Dec. 19, 2008, 322(5909), 11 pages.

W.A. Clarkson, N.P. Barnes, P.W. Turner, J. Nilsson, D.C. Hanna, "High power cladding pumped Tm doped silica fiber aser with wavelength tuning from 1860 to 2090 nm," Optics Letters, Nov. 15, 2002, vol. 27, No. 22, pp. 1989-1991.

S. Tan, L. Yang, X. Wei, C. Li, N. Chen, K. K. Tsia, and K. K. Y. Wong, "High-speed wavelength-swept source at 2.0 um and its application in imaging through a scattering medium," Optics Letters, (2017) 42, pp. 1540-1543.

M. Janeczek, et al., "Preliminary Evaluation of Thulium Doped Fiber Laser in Pig Model of Liver Surgery," BioMed Research International (2018), pp. 1-7.

C. Li, J. Shi, X. Wang, B. Wang, X. Gong, L. Song, and K. K. Y. Wong, "High-energy all-fiber gain-switched thulium- doped fiber laser for volumetric photoacoustic imaging of lipids," Photonics Research, Feb. 2020, vol. 8, No. 2, pp. 160-164.

Z. Li, S. U. Alam, Y. Jung, A. M. Heidt, and D. J. Richardson, "All-fiber, ultra-wideband tunable laser at 2 μm," Optics Letters, Nov. 15, 2013, vol. 38, No. 22, pp. 4739-4742.

C. Li, N. Chen, X. Wei, J. Kang, B. Li, S. Tan, L. Song, and K. K. Y. Wong, "High-power widely tunable all-fiber thulium-assisted optical parametric oscillator at SWIR band," Optics Letters, Nov. 15, 2016, vol. 41, No. 22, pp. 5258-5261.

J. Hui, et al., "High-speed intravascular photoacoustic imaging at 17 μm with a KTP-based OPO," Biomedical Optics Express, Nov. 1, 2015, vol. 6, No. 11, pp. 557-4566.

P. Wang, H.-W. Wang, M. Sturek, and J.-X. Cheng, "Bond-selective imaging of deep tissue through the optical window between 1600 and 1850 nm," Journal of Biophotonics 5, (2012) pp. 25-32.

H.-W. Wang, N. Chai, P. Wang, S. Hu, W. Dou, D. Umulis, L. V. Wang, M. Sturek, R. Lucht, and J.-X. Cheng, "Label-free bond-selective imaging by listening to vibrationally excited molecules." Physical Review Letters 106, (2011), pp. 238106-1-238106-4.

Y. Li, X. Gong, C. Liu, R. Lin, W. Hau, X. Bai, and L. Song, "High-speed intravascular spectroscopic photoacoustic Imaging at 1000 A-lines per second with a 0.9-mm diameter catheter," Journal of Biomedical Optics, Jun. 2015, 20(6), pp. 065006-1-065006-7.

P. Wang, P. Wang, H.-W. Wang, and J.-X. Cheng, "Mapping lipid and collagen by multispectral photoacoustic imaging of chemical bond vibration," Journal of Biomedical Optics ), Sep. 2012, vol. 17(9), pp. 0960101-1-0960101-5.

P. Wang, J. R. Rajian, and J.-X. Cheng, "Spectroscopic imaging of deep tissue through photoacoustic detection of molecular vibration," The Journal of Physical Chemistry Letters 4, (2013), pp. 2177-2185.

P. Wang, T. Ma, M. N. Slipchenko, S. Liang, J. Hui, K. K. Shung, S. Roy, M. Sturek, Q. Zhou, Z. Chen, and J.-X. Cheng, "High-speed intravascular photoacoustic imaging of lipid-laden atherosclerotic plaque enabled by a 2-kHz barium nitrite raman laser," Scientific Reports 4, (2014), pp. 1-7.

J. R. Rajian, R. Li, P. Wang, and J.-X. Cheng, "Vibrational Photoacoustic Tomography: Chemical Imaging beyond the Ballistic Regime," The Journal of Physical Chemistry Letters 4, Sep. 11, 2013, pp. 3211-3215.

R. Li, P. Wang, L. Lan, F. P. Lloyd, C. J. Goergen, S. Chen, and J.-X. Cheng, "Assessing breast tumor margin by multispectral photoacoustic tomography," Biomedical Optics Express 6, (2015) pp. 1273-1281.

R. Li, E. Phillips, P. Wang, C. J. Goergen, and J.-X. Cheng, "Label-free in vivo imaging of peripheral nerve by multispectral photoacoustic tomography," Journal of Biophotonics 9, (2016), No. 1-2, pp. 124-128.

(56) References Cited

OTHER PUBLICATIONS

M. Diem, A. Mazur, K. Lenau, J. Schubert, B. Bird, M. Miljković, C. Krafft, and J. Popp, "Molecular pathology via IR and Raman spectral imaging," Journal of Biophotonics 6, (2013), No. 11, pp. 855-886.

D. Zhang, C. Li, C. Zhang, M. N. Slipchenko, G. Eakins, and J.-X. Cheng, "Depth-resolved mid-infrared photothermal Imaging of living cells and organisms with submicrometer spatial resolution," Science Advances, Sep. 26, 2016, 2, pp. 1-7.

C. Zhang and J.-X. Cheng, "Perspective: coherent raman scattering microscopy, the future is bright." APL Photonics 3, (2018) pp. 090901-1-090901-16.

M. A. Pleitez, et al., "Label-free metabolic imaging by mid-infrared optoacoustic microscopy in living cells," Nature Biotechnology, Mar. 2020, vol. 38, pp. 293-296.

M. Janeczek, et al., "Preliminary Evaluation of Thulium Doped Fiber Laser in Pig Model of Liver Surgery," BioMed Research International, (2018), vol. 2018, pp. 1-7.

D. C. Kirsch, S. Chen, R. Sidharthan, Y. Chen, S. Yoo, and M. Chernysheva, "Short-wave IR ultrafast fiber laser systems: Current challenges and prospective applications," Journal of Applied Physics 128, Nov. 12, 2020, pp. 180906-1-180906-25.

S. L. Jacques, "Optical properties of biological tissues: a review," Physics in Medicine and Biology, (2013) 58, 6007-5008. pp. R37-R61.

C. Yang, Y. Bi, E. Cai, Y. Chen, S. Huang, Z. Zhang, and P. Wang, "Pulse-sheet chemical tomography by counter-propagating stimulated Raman scattering," Optica 8, Mar. 2021, pp. 396-401.

L. L. Randeberg and J. Hernandez-Palacios, "Hyperspectral imaging of bruises in the SWIR spectral region," Photonic Therapeutics and Diagnostics VIII, (2012) vol. 8207, pp. 82070N-1-82070N-9.

T. Bruns, et al., "Next-generation in vivo optical imaging with short-wave infrared quantum dots." Nat. Biomed. Eng., Apr. 10, 2017, vol. 1, No. 0056, pp. 1-11.

H. Akbari, Y. Kosugi, K. Kojima, and N. Tanaka, "Detection and Analysis of the Intestinal Ischemia Using Visible and Invisible Hyperspectral Imaging," IEEE Transactions on Biomedical Engineering, (2010), 57, pp. 2011-2017.

Y. Zhao, A. Pilvar, , "Shortwave-infrared meso-patterned imaging enables label-free mapping of tissue water and lipid content," Nature Communications, (2020), pp. 1-11.

M. Li, J. Shi, C. C. Y. Yiu, C. Li, K. K. Y. Wong, and L. Wang, "Near-infrared double-illumination optical-resolution photoacoustic microscopy," Journal of Biophotonics, 14, (2020), pp. 1-8.

\* cited by examiner

FIG. 2A
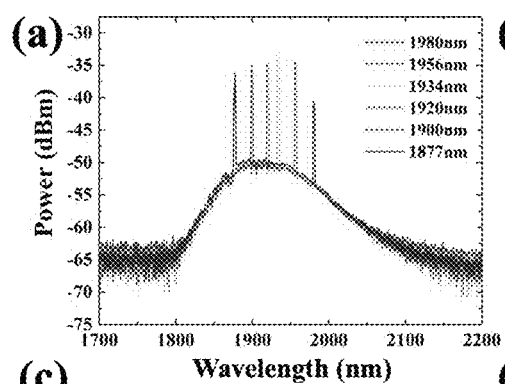
FIG. 2B
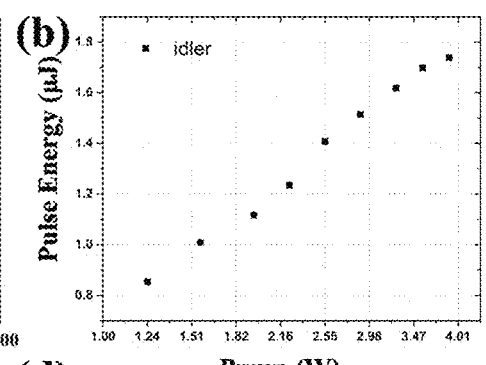
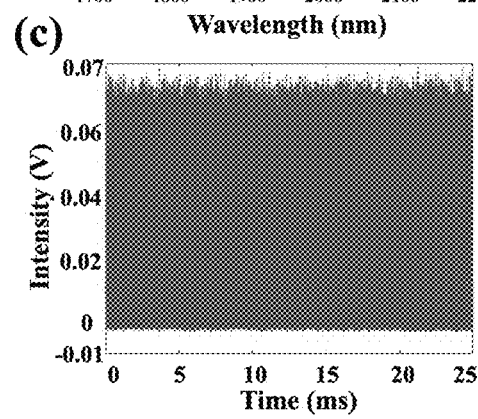
FIG. 2C
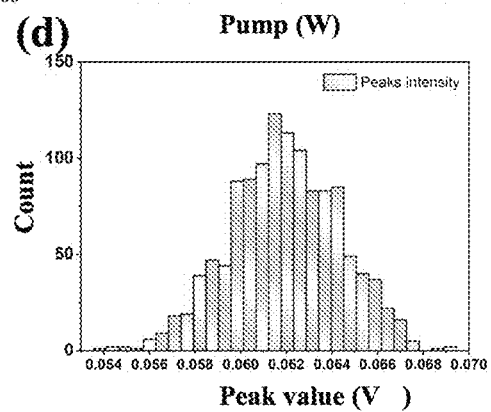
FIG. 2D

HYBRID OPTICAL PARAMETRICALLY-OSCILLATING EMITTER

CROSS-REFERENCE TO RELATED APPLICATION

The present application claims the benefit of priority to U.S. provisional patent application Ser. No. 63/290,499 filed Dec. 16, 2021, which is hereby incorporated herein by reference in its entirety.

FIELD OF THE INVENTION

The present invention relates to systems for visualizing the water content in the deep tissue of biological organisms and, more particularly, to the use of photoacoustic imaging to visualize water distribution in deep tissue.

BACKGROUND OF THE INVENTION

Water is a vital component closely related to biological metabolism. Mapping of the water content would be beneficial in analyzing the biological and pathological properties of the cells, tissues and organs. In a conventional system, coherent Raman scattering (CRS) microscopy has been developed successfully to map the water in tissue with micron-level spatial resolution, high signal-to-noise ratio (SNR) and a fine signal-to-background ratio. [28] However, CRS microscopy utilizes all-optical excitation and detection, resulting in a limited penetration depth due to the strong scattering of light inside biological tissue. In addition, CRS microscopy requires a pico- or femtosecond intense laser, whose expensive costs make this technique less accessible and commercialized.

A technique to visualize the water content in deep tissue with high spatial resolution and good signal-to-noise ratio (SNR) is photoacoustic imaging (PAI). It is a powerful label-free imaging tool for sensing the chemical bonds in the deep tissue. [11-16] Via molecular overtone transitions and combinational band absorptions, the vibration-based photoacoustic (PA) signal can be generated for imaging the specific chemical bond-rich tissues. This technique has been developed into multiple branches, such as the high-speed intravascular vibrational photoacoustic catheter for imaging lipid-laden plaques [17, 18], vibration-based photoacoustic tomography for mapping the margin of breast cancer [19] and the femoral nerve discriminated from the femoral artery [20]. For the PAI technique to visualize the water content in the deep tissue with high spatial resolution and good SNR, the laser source should have high laser pulse energy, a fast pulse repetition rate, and accurate wavelength tunability at which water has relatively strong absorption. [21-24] However, only a few articles had been reported on the use of PAI to image the water distribution due to a lack of suitable laser sources.

Water has significantly stronger absorption in multiple absorption peaks located at 975 nm, 1160 nm, 1450 nm, and 1930 nm. Among these, the absorption coefficient of water at 1930 nm is the strongest [1]. Currently, there are two major kinds of suitable light source for the PAI technique, i.e., (1) a tuneable Optical Parametric Oscillator (OPO) laser operating at around 1000 nm along with a photoacoustic computed tomography system to image the water content in the phantom and the brain of a mouse and (2) Thulium-doped fiber lasers or Thulium-doped fiber amplifiers (TDFAs) pumped by an Er/Yb-doped fiber laser provide over a 100 nm wavelength range around 1900 nm.

Xu et al. employed a tunable OPO laser operating at around 1000 nm along with a photoacoustic computed tomography system to image the water content in the phantom and mice's brain [2, 3]. It indicated that PAI could have the potential to image water distribution in the deep tissue. However, existing bio-tissue water imaging using a photoacoustic technique leveraging optical parametric OPOs working at 1000 nm optical wavelength have a drawback. Owing to the relatively low absorption of water at around 1000 nm, imaging with the OPOs usually requires milli-joule level pulse energy, which may induce photodamage in the tissue [2,3]. In addition, OPOs using free-space optics, are usually bulky, expensive and sensitive to environmental disturbance [4]. This creates a major technical obstacle for applications such as clinical examination and on-site measurements.

At the short-wave infrared (SWIR) region (900-2000 nm), the water has significantly stronger absorption, involving multiple absorption peaks located at 975 nm, 1160 nm, 1450 nm, and 1930 nm [1]. Among them, the absorption coefficient of water at 1930 nm is the strongest, reaching 117.6 $cm^{-1}$. Moreover, the absorption of lipids at 1930 nm is 2.11 $cm^{-1}$, which is close to two orders of magnitude smaller than the water's absorption. The initial PA amplitude can be expressed as, $p_0 = k\Gamma\mu_a F$, where k is a constant related to the imaging system, $\Gamma$ is the Grüeneisen parameter of the chromophore, $\mu_a$ is the absorption coefficient, and F is the local laser fluence. For the same laser and pulse energy, the PA signals generated from different chromophores should be proportional to $\Gamma\mu_a$. Therefore, the PA contrast of water versus lipid at 1930 nm could be expressed as $P_{water}/P_{lipid} = (\Gamma\mu_a)_{water}/(\Gamma\mu_a)_{lipid}$. Because the Grüeneisen parameter of lipid and water are 0.7-0.9 and 0.12 at 22° C., respectively, the PA contrast of water versus lipid at 1930 nm is 7.7-10. From the analysis above, vibration PAI at 1930 nm could image the water content with higher sensitivity and finer signal-to-noise ratio (SNR). Meanwhile, the artifact signal arising from the lipid in the complex environment could be suppressed at 1930 nm. These features make 1930-nm pulsed laser a suitable choice to map the water content using the PAI technique.

Another bio-tissue water imaging photoacoustic scheme uses Thulium-doped fiber lasers to generate over 100 nm wavelength range around 1900 nm. The present inventors developed a system called thulium-assisted optical parametric oscillator (TAOPO) [10]. However, Thulium-doped fiber lasers have a MHz repetition rate and tens of milliwatt average power, which generates tens of nano joule single energy pulses, which is insufficient for tissue water imaging with photoacoustic technique [5-7]. There have been attempts to boost the 1900 nm pulses with Thulium-doped fiber amplifiers (TDFAs). However, the maximum pulse energy was still only ~162 nJ, which is inadequate for biological tissue photoacoustic imaging (PAI) in the SWIR region. [8-10].

In the prior work [8] a passively gain-switched thulium-doped fiber laser was used at 1750 nm for lipid-rich tissue imaging. However, that system is not useful for imaging other components in tissue, like water and protein, which have rich absorption at the short-wave infrared (SWIR) region from 1200 nm to 2000 nm. Further, most commercial sources at SWIR, employ bulky solid-state lasers to achieve a high pulse energy, at a high cost and low stability, which significantly hinders the development of clinical application like intravascular imaging and noninvasive blood sugar monitoring.

US Application Publication 2008/0255433 of Prough et al. discloses an optoacoustic (equivalent to a photoacoustic) technique for absolute, accurate, continuous, and real-time measurement of a variety of important diagnostic variables including the content of water in tissues. An article by Perkov et al., "Optoacoustic monitoring of water content in tissue phantoms and human skin," *J. Biophotonics* 14, e202000363 (2021). Disclosed optoacoustic water detection in tissue phantoms and the skin in vivo for a wide spectral range from 1370 to 1650 nm. Both the patent publication and article are incorporated herein by reference in their entirety. The patent publication explored the water content in bio-tissue at relatively short wavelengths, such as 970 nm, 1200 nm, and 1450 nm, which are generated by an OPO. As is mentioned, OPOs using free-space optics, are usually bulky, expensive and sensitive to environmental disturbance. The article in *J. Biophotonics* demonstrated optoacoustic water detection in tissue phantoms and the skin in vivo in a wide spectral range from 1370 to 1650 nm, where water is the major tissue chromophore. The light source in the paper was also a type of OPO source.

In conventional design, rare-earth doped fiber is normally used as the gain medium to build a laser cavity, e.g., for an OPO. Recently, the fiber lasers at the SWIR region have drawing growing interests in biomedical imaging and biosensing [6, 25, 26]. A Thulium-doped fiber amplifier (TDFA) pumped by an Er/Yb-doped fiber laser provides a gain of over 30 dB in the wavelength range over 100 nm around 1900 nm. Empowered by the significant gain offered by the Tm3+ ion, TDFL may be able to emit high-power laser pulses with a high repetition rate for generating PA signal efficiently [8-10]. Previous work by the present inventors shows that a tunable thulium-assisted fiber optical parametric oscillator (TAOPO) operating from 1700 nm to 2100 nm can be developed with a pulse width of 2 ns at 3.2 MHz [10]. Hindered by the high repetition rate and insufficient gain inside the fiber cavity, the maximum pulse energy is only ~162 nJ, which is inadequate for biological tissue PAI at the SWIR region

SUMMARY OF THE INVENTION

The present invention is based on a hybrid amplification scheme, parametric gain plus rare-earth fiber, to achieve a high wavelength tunability and a high pulse energy with ns pulse duration. The parametric process in highly-nonlinear fiber (HNLF) converts the energy at around 1560 nm to a signal at greater than 1700 nm, e.g., 1900 nm to 2000 nm. After parametric amplification, the signal is further boosted by a piece of thulium-doped fiber (TDF) inside a cavity. Also, the wavelength tunability can be realized by tuning the pump wavelength in a four-wave mixing process. Thus, the invention involves the use a novel high-power all-fiber hybrid optical parametrically-oscillating emitter operating from 1900 nm to 2000 nm, but preferably at 1930 nm and a novel hybrid cavity design using highly-nonlinear fiber and rare-earth doped fiber to detect the O—H bond in water, an aqueous sample and biological tissue in vitro.

The laser is used in PAI technology with micron-level spatial resolution, fine signal-to-noise ratio, improved penetration depth, and suppressed artifact signal. The system comprises a fiber optical parametric oscillator and a segment of TDF, and it generates 15-ns laser pulses at preferably 1930 nm with 1-nm bandwidth and single pulse energy over 1.74p at a pulse repetition rate of 50 kHz. This differs from the inventor's prior work [8-10] in that a bi-directional pumping scheme in the prior system was discarded to reduce the amplified spontaneous emission (ASE), the cavity length was extended by connecting a fiber optic gyroscope to reduce the pulse rate and the connection loss was optimized between two different gain fibers inside the cavity. Also, an external thulium-doped fiber amplifier (TDFA) was connected outside the cavity to provide more gain for signals at SWIR. Further, the pulse energy was increased to a sub-mJ level to meet the pulse energy requirement. These changes resulted in excellent advantages that allow this technique to open a broad avenue for biological research and disease diagnosis.

The present invention allows for bio-tissue water imaging with PAI technique at 1930 nm, which was not previously successful due to the strong absorption of water at 1930 nm. Thus, the invention provides higher signal to noise ratio. Further, the novel light source of the present invention has significant pulse energy improvement over previous technologies, which paves the way for highly efficient water imaging with the PAI technique. Further, the light source is all-fiber based, which is low cost, robust and simple (no free-space alignment is needed).

Due to the strong absorption of water at 1930 nm ($\mu_a$=117.6 cm-1), using a 15-ns pulse with only sub-mJ pulse energy, the PAI technique with the novel light source of the present invention offers absorption-based optical contrast, acoustic penetration ability, and an imaging sensitivity eight orders of magnitude larger than the Raman imaging technique. It is expected to image the water with a good SNR, e.g., ~19 dB, and tissue penetration of up to 2.4 mm, which is much deeper than is possible with the Raman imaging technique or the visible and near-infrared band OR-PAM technique due to the lower photon scattering in the tissue. More importantly, the water versus lipid photoacoustic contrast ratio at 1930 nm is 7.7-10, enabling the system of the present invention to image water distribution with suppressed artifact signal generation from the lipid, which was one of the most common components in biological tissues.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The foregoing and other objects and advantages of the present invention will become more apparent when considered in connection with the following detailed description and appended drawings in which like designations denote like elements in the various views, and wherein:

FIG. 2A is a graph of an output laser spectrum after the EDFA2 in FIG. 1A, FIG. 2B is a graph of the relationship between the final output laser pulse energy and the pump power, FIG. 2C is a graph of a 1930-nm pulse train consisting of 1,225 subsequent laser pulses in the temporal domain after the TDFA in FIG. 1A, and FIG. 2D is a bar chart of histogram of the pulse peak value;

DETAILED DESCRIPTION OF THE INVENTION

To verify the system performance of the present invention, a volumetric water content imaging experiment was conducted using a phantom and in-vitro fresh biological tissue. The experiment was conducted by launching the output pulses of a high-power all-fiber hybrid optical parametrically-oscillating emitter (HOPE) into an optical-resolution photoacoustic microscopy (OR-PAM) system. The performance of the OR-PAM system in imaging the water and lipid content of adipose tissue were explored and compared by using 1930-nm and 1750-nm pulses.

Figure 1A:
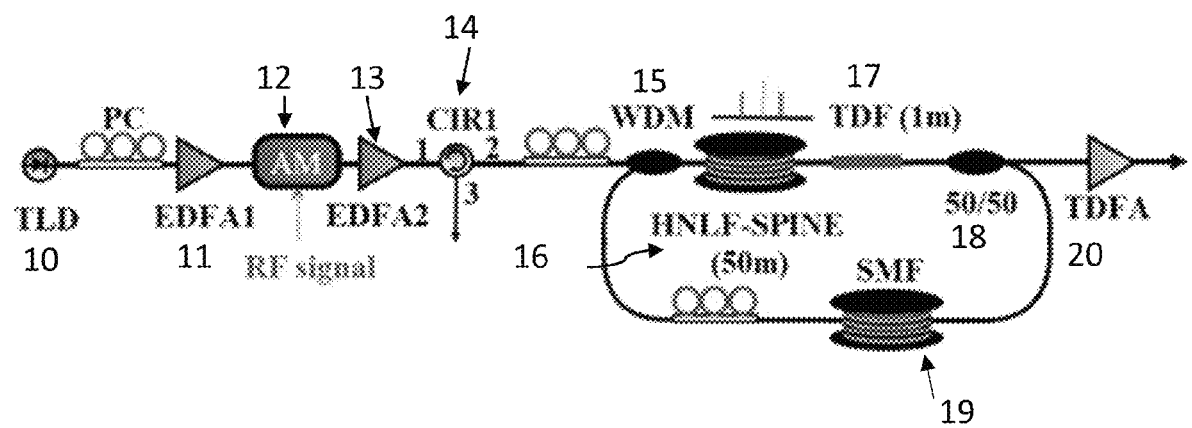
FIG. 1A is a schematic diagram of a hybrid optical parametrically-oscillating emitter operating according to the present invention.

FIG. 1A depicts the schematic diagram of the 1930-nm HOPE system. The pump for the parametric conversion process was seeded by a tunable laser source (TLD) 10. The output of the TLD was first amplified to 10 mW by a low-power erbium-doped fiber amplifier (EDFA1) 11 and then launched into a Mach-Zehnder amplitude modulator (AM) 12 to generate rectangular pulses. The AM 12 was driven by a radio frequency (RF) signal with a 15 ns pulse width at a 50 kHz repetition rate, which corresponds to a 0.075% duty ratio. The output of AM 12 was passed through a tunable bandpass filter with a 1-nm spectral bandwidth so as to filter out undesired amplified spontaneous emission (ASE). The filtered output was applied to a high power EDFA (EDFA2) 13 to boost the average power of the laser pulse train to 2-W. The peak power of the pulses after EDFA2 was 2.67 kW. After passing through a fiber circulator (CIR1) 14, the high-energy 1560-nm pulsed laser signal was delivered into a cavity via a 1950/1550 nm fiber wavelength-division-multiplexing coupler (WDM) 15. The parametric conversion occurred when the pump pulses passed through a spool of about 50 meters of highly nonlinear fiber with stable phase-matching for improved nonlinear efficiency (HNLF-SPINE, OFS) 16, which performed as the parametric gain medium in the cavity.

In principle, distinct and narrowband gain regions can be obtained when the pump is operating according to the normal dispersion regime [32]. In optical parametric generation, the input is one light beam of frequency $\omega_p$, and the output is two light beams of lower frequencies $\omega_s$ and $\omega_i$, with the requirement $\omega_p=\omega_s+\omega_i$. These two lower-frequency beams are called the "signal" and "idler", respectively. By carefully tuning the polarization state of the laser with a polarization controller (PC), a four-wave mixing process can convert the pump energy to a narrowband idler at a wavelength from 1800 nm to 2000 nm with the pump wavelength tuned from 1541 nm to 1563 nm. Subsequently, the idler was amplified via a 1-m Thulium-doped fiber TDF 17 (OFS-TmDF200), in which the residual pump at the 1550-nm band was further depleted for boosting the idler power to enhance the cavity gain. In this process, the idler provided a narrowband seed signal to TDF 17, which made the amplified output energy more concentrated in the wavelength of interest at 1930 nm. This resulted in an output laser pulse with an improved SNR. After the TDF 17, the idler power was measured at over 10 dB higher than the residual pump in the optical spectrum analyser (OSA, Yokogawa, AQ6375). A 50/50 fiber coupler 18 was connected to the TDF so that one stream of laser signal was output for external amplification and another stream guided the idler back to the input port of the cavity via the 1950-nm port of WDM 15. A spool of 200 meters single-mode fiber (SMF) 19 was utilized to increase the cavity length, so the total length of the cavity was around 267 m, corresponding to the 750 kHz fundamental cavity repetition rate. It should be noted that the modulation repetition rate of the AM was set at 50 kHz rather than 750 kHz for higher pulse energy generation. The output 1930-nm pulses were further boosted by another TDFA 20 outside the cavity with an extra 1.5-W pumping at 1650 nm.

The final output average power of the 1930-nm pulses was 53.4 mW, and the corresponding single pulse energy is 1.07 µJ. The output spectra were captured by the OSA, as shown in FIG. 2A, which represents the output laser spectrum after the EDFA2. Nearly all of the residual pump power from OPO laser 10 and TDFA 20 was depleted out, and only amplified idler can be observed in the optical spectrum analyser. When the pump wavelength was tuned from 1551 nm to 1559 nm, the idler wavelength could be adjusted from 1877 nm to 1980 nm. It is worth noting that the idler at around 1934 nm in FIG. 2A experienced the maximum gain at TDF. The maximum gain was realized by adjusting the TDF length via the "cutting-back method" to 7.86 m, where the gain spectrum peak was moved to the desired wavelength, i.e., 1930 nm. The output power and pulse stability at this wavelength were further examined. FIG. 2B shows the relationship between the final output laser pulse energy and the pump power and that the idler pulse energy increases linearly with an increased pump power from 1 W to 4 W. The maximum pulse energy is 1.74 µJ. The temporal pulse train of the output was measured with a real-time oscilloscope. As shown in FIG. 2C the 1930-nm pulse train consisted of 1,225 subsequent laser pulses in the temporal domain after the TDFA in FIG. 1A. Its pulse peak intensity value histogram is shown in FIG. 2D. The standard deviation to the mean ratio (std/mean) was calculated to be 3.86% over 1,225 subsequent laser pulses. The 1930-nm pulses were delivered via a 0.5-m SMF to a transmission-mode OR-PAM system as shown in FIG. 1B.

Figure 1B:
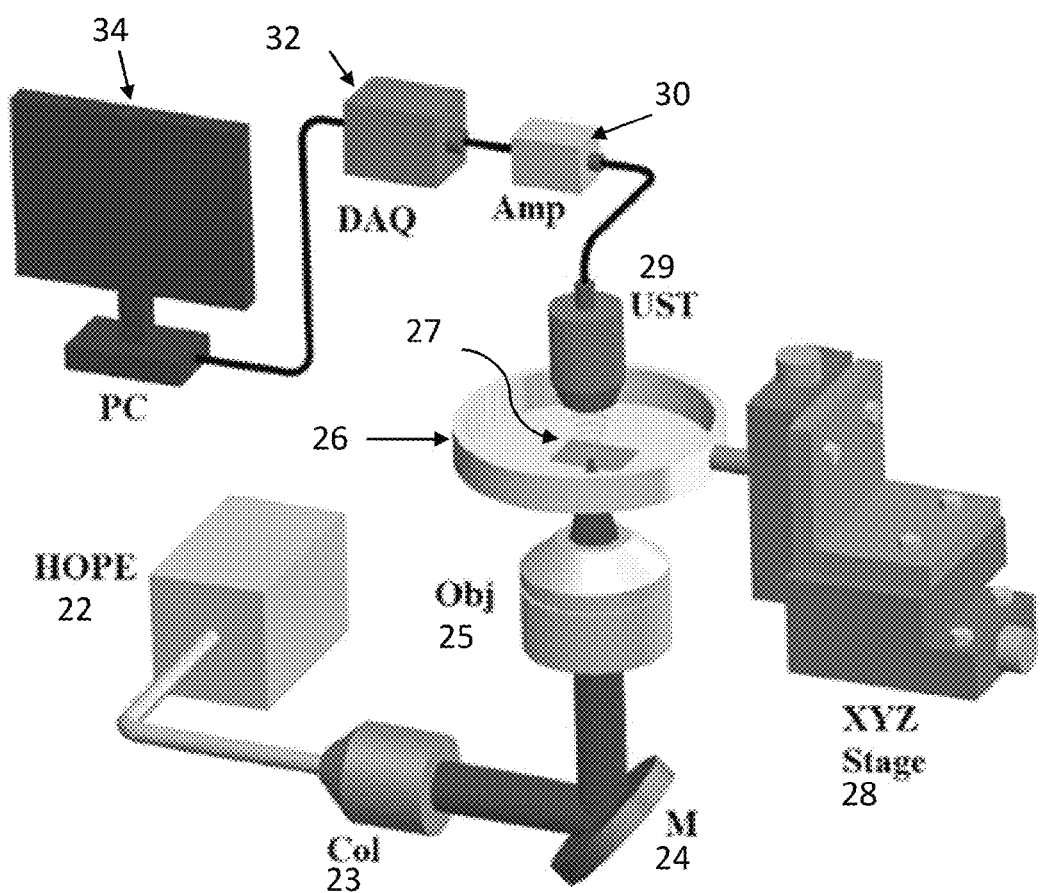
FIG. 1B is an optical-resolution photoacoustic microscopy (OR-PAM) system using the emitter.

The OR-PAM system in FIG. 1B is similar to the one in the inventor's previous work [8]. The 1930-nm laser beam from HOPE 22 is directed to a collimator 23, reflected from a mirror 24 and focused by an objective lens 25 (0.1 NA, PlanN 4×, Olympus) for transmission through an optical window (UDP10, Infrasil). This window provides transmission over 95% at around 1930 nm. The beam then illuminates a sample 27 in a water tank 26 to excite photoacoustic (PA) signals. The sample is placed beneath water in the tank and has a thin polyethylene membrane for isolation from the water. The water at the sample surface and the water in the tank act as the acoustic coupling agents. The whole water tank 26 with the sample is mounted on an X-Y-Z translational stage 28 so as to be able to conduct raster-scanning. An ultrasonic transducer UST 29 (V316, Olympus, 10 MHz) collects the photoacoustic PA wave at the same spot of light excitation and converts it to an electrical signal. The electrical signals are successively amplified by two cascaded RF low-noise amplifiers 30 (ZFL-500LN+, Mini-Circuits, 28 dB), and then are filtered by a low-pass filter (BLP-10.7+, Mini-Circuits, DC-11 MHz) before being digitalized by an oscilloscope (SDA8Zi-B, Teledyne LeCroy) or a data acquisition card DAQ 32 and a personal computer PC 34. The PA signal has its center frequency at 10 MHz. Therefore, the sampling rate of the oscilloscope is set to 100 MHz and the sampling length is selected to be 500, which corresponds to a 5-μs time window. Considering the speed of sound in tissue (1.56 mm/μs), the traveling distance of the photoacoustic PA signal in this time window is calculated to be 7.8 mm, which means in this time window that it is sufficient to capture all photoacoustic signals in the depth of field (~0.1 mm).

Figure 3A:
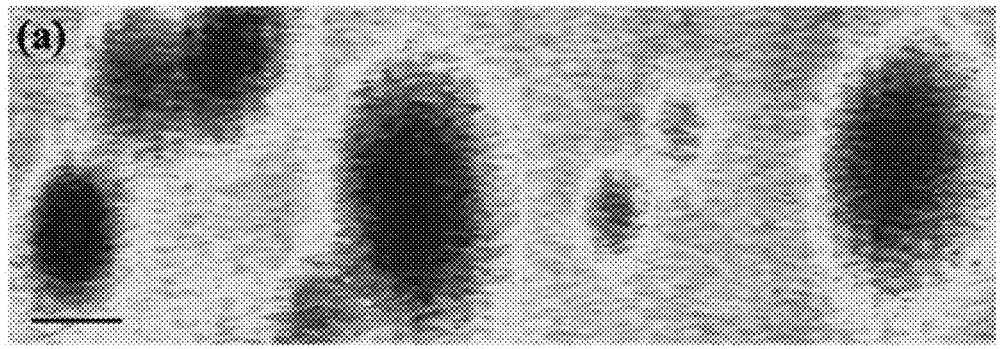
FIG. 3A is a photoacoustic (PA) image of ultrasound gel mixed air bubbles.
Figure 3A:
Figure 3B:
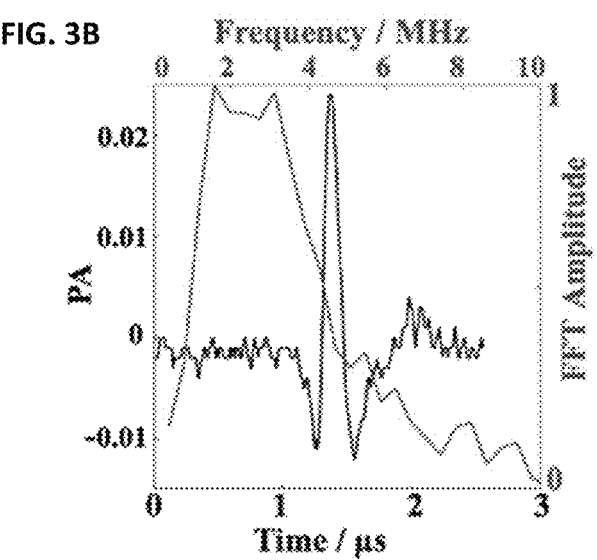
FIG. 3B is a time-domain PA signal of water and its frequency spectrum.

In the phantom study, the 1930-nm OR-PAM was employed to image ultrasound gel mixed with air bubbles, as shown in FIG. 3A. The air bubbles inside the gel performed as the negative-contrast agent. Here, the pulse energy of the 1930-nm laser was kept at 300 nJ, and the step size was 20 μm. The PA signal was acquired at the sampling rate of 100 MHz with averaging by four times at each pixel. The single PA signal length was 500 points, and the corresponding time window was 5 μs. One A-line was extracted after averaging, its SNR was computed, and frequency analysis was performed. FIG. 3B shows the time-domain PA signal of water and its frequency spectrum. The SNR of the A-line (red graph) can reach 19 dB and its frequency mainly ranges from 1 to 4 MHz.

Figure 3C:
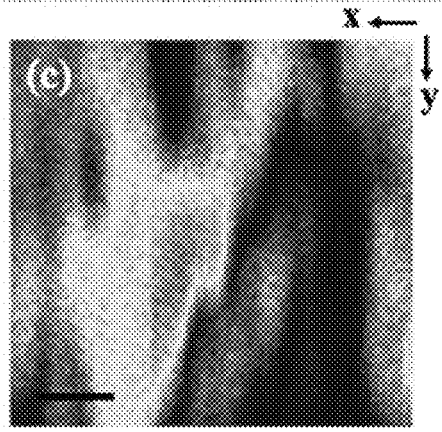
FIG. 3C is a two-dimensional PA image of salmon fish belly.
Figure 3D:
FIG. 3D is a three-dimensional rendering view of FIG. 3C.

The 1930-nm OR-PAM system of the present invention was also used to provide a two-dimensional image of salmon fish belly as shown in FIG. 3C and its 3-D rendering view image is shown in FIG. 3D. The pulse energy was adjusted to 1 μJ. The step size and averaging time were kept at 20 μm and 4 times. From that, the muscle texture of the salmon fish tissue can be visualized with high contrast to the adipose region.

Figure 3E:
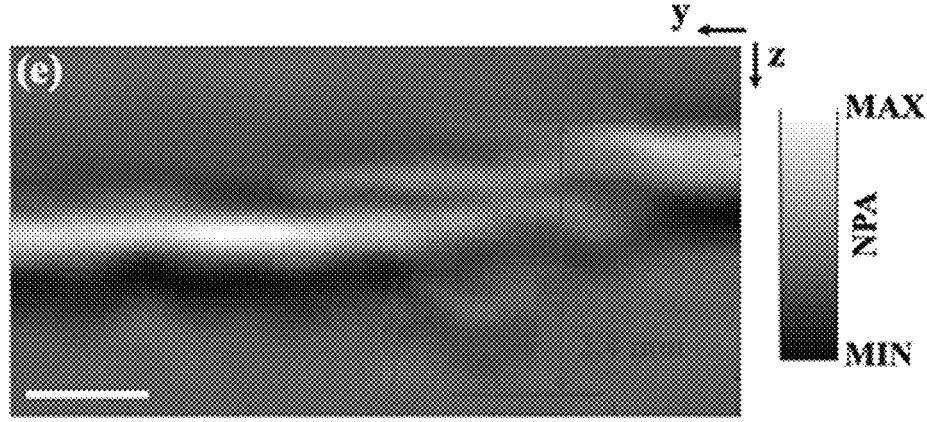
FIG. 3E is a B-mode image of FIG. 3C.

A B-Mode is a two-dimensional ultrasound image display composed of bright dots representing the ultrasound echoes. From the B-mode image of the salmon fish belly in FIG. 3E, in which the scale bars are 500 μm, it can be seen that the 1930-nm OR-PAM improved the penetration depth up to 2.4 mm, due to reduced photon scattering in the tissue compared with the OR-PAM operating with visible and shorter wavelength near-infrared lasers [27]. The improved penetration ability facilitates the use of the 1930-nm OR-PAM for quantitative imaging of water content in deep tissue.

Figure 4A:
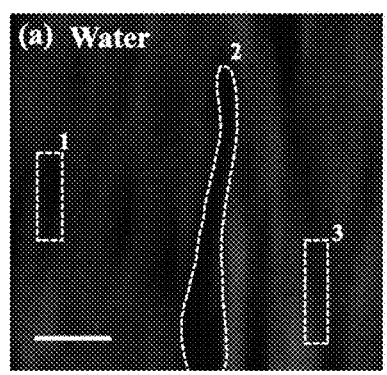
FIG. 4A is PA image of water acquired by the 1930-nm OR-PAM.
Figure 4B:
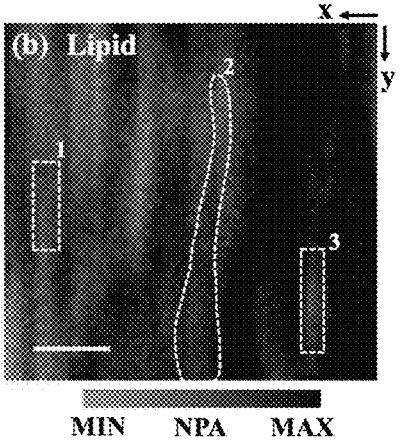
FIG. 4B is a PA image of lipid acquired by 1750-nm OR-PAM.
Figure 4C:
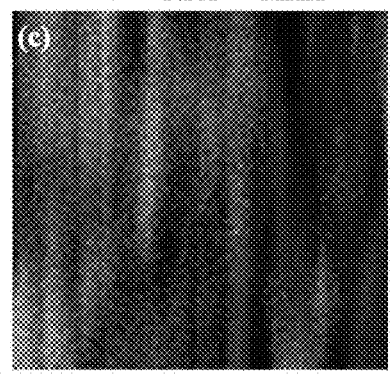
FIG. 4C is an overlaid PA image of FIG. 1A and FIG. 1B.

Finally, to demonstrate that the 1930-nm OR-PAM can image the water with suppressed artifact signals from the lipid, the previously developed 1750-nm OR-PAM was utilized along with the 1930-nm OR-PAM system to image the lipid and water in the adipose tissue. Then both PA images were overlaid as shown in FIG. 4A to FIG. 4C. In particular FIG. 4A shows the PA image of water acquired by the 1930-nm OR-PAM and FIG. 4B shows a lipid acquired by 1750-nm OR-PAM. The pulse energy at 1750 nm and 1930 nm were set to 5 μJ and 1 μJ, respectively. The step size and averaging time were kept the same as in the above experiments. A white dash line was used to highlighted three of the same regions in the PA images of both the water and lipid, in which the lipid PA signals were strong while the water PA signal was negligibly weak. This proved that the 1930-nm OR-PAM of the present invention can visualize the water distribution in the complex tissue environment and suppress the artifact signal arising from the lipid, which is rich in many biological tissues.

Figure 4D:
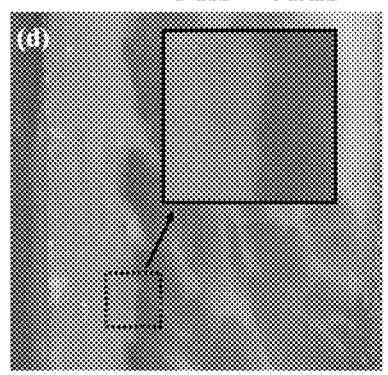
FIG. 4D is a photo of adipose tissue and FIGS. 4E and 4F are three-dimensional rendering views of FIG. 1A and FIG. 1B, respectively.
Figure 4E:
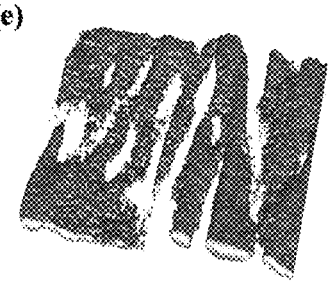
Figure 4F:
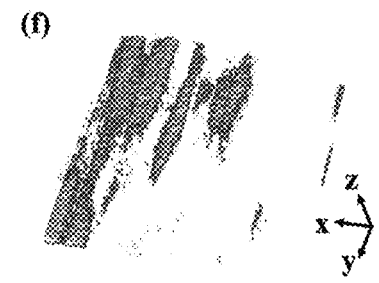

FIG. 4C shows overlaid PA images of FIGS. 4A and 4B. FIG. 4D is a photogram of adipose tissue. FIGS. 4E and 4F are 3-D rendering views of FIGS. 4A and 4B, respectively, with scale bars of 500 μm. They show a coincident muscle texture of the adipose tissue.

Other label-free optical imaging techniques at the shortwave infrared wavelength region (SWIR) for water imaging require expensive InGaAs and germanium detectors, which have become commercially available in recent years [29, 30, 31, 32]. Due to the strong absorption of water at 1930 nm ($\mu_a$=117.6 cm$^{-1}$), using 15-ns pulse with only sub-pJ pulse energy, the 1930-nm OR-PAM offers absorption-based optical contrast, acoustic penetration ability, and an imaging sensitivity eight orders of magnitude larger than the Raman imaging technique [24]. It can image the water with good SNR ~19 dB and penetrate up to 2.4 mm in the tissue, which is much deeper than the Raman imaging technique as well as the visible and near-infrared band OR-PAM techniques due to lower photon scattering in the tissue. More importantly, the water versus lipid PA contrast ratio at 1930 nm is 7.7-10, enabling the 1930-nm OR-PAM to image water distribution with suppressed artifact signals generated from the lipid, which is one of the most common components in biological tissues.

Moreover, 1930-nm OR-PAM can also operate in the epi-mode for in vivo application. To mitigate the laser attenuation, heavy water or heavy water-based ultrasound gel can be used as the ultrasound coupling medium [33].

Further, the novel high-power HOPE at 1930 nm has a 1930-nm pulse energy over 1.74 μJ with a pulse repetition rate of 50 kHz and pulse width of 15 ns. With the HOPE system, a vibrational optical-resolution photoacoustic microscopy system is able to detect the O—H bond in the water, aqueous sample, and biological tissue in vitro. It can image the water distribution in the deep tissue with micron-level spatial resolution, fine SNR, improved penetration depth, and suppressed artifact signal. These excellent advantages help this technique open a broad avenue for biological research and disease diagnosis.

In the embodiment of this system discussed above, the polarization of the light wave is tuned manually with manual fiber polarization controllers. As a result, it is hard to integrate the light source and it may not be user friendly. For a practical product, the manual polarization controllers are replaced with motorized versions, which is quite easy and straightforward to accomplish.

The present invention can be used in volumetric photoacoustic imaging of water content in bio-tissue. In addition to using the invention in existing and traditional optical imaging systems, e.g. the photoacoustic imaging, for general bio-tissue imaging, it can be used in the field of intravascular photoacoustic imaging to diagnose plaque type in the blood vessels.

REFERENCES

The cited references in this application are incorporated herein by reference in their entirety and are as follows:

[1] J. Tian and W. D. Philpot, "Relationship between surface soil water content, evaporation rate, and water absorption band depths in SWIR reflectance spectra," Remote Sensing of Environment 169, 280-289 (2015).

[2] Z. Xu, Q. Zhu, and L. V. Wang, "In vivo photoacoustic tomography of mouse cerebral edema induced by cold injury," Journal of Biomedical Optics 16, 066020 (2011).

[3] Z. Xu, C. Li, and L. V. Wang, "Photoacoustic tomography of water in phantoms and tissue," Journal of Biomedical Optics 15, 036019 (2010).

[4] Freudiger, C. W. et al. Label-free biomedical imaging with high sensitivity by stimulated Raman scattering microscopy. Science 322, 1857-1861 (2008).

[5] W. A. Clarkson, N. P. Barnes, P. W. Turner, J. Nilsson, D. C. Hanna, "High power cladding pumped Tm doped silica fiber laser with wavelength tuning from 1860 to 2090 nm," Opt. Lett. 27, 1989-1991 (2002).

[6] S. Tan, L. Yang, X. Wei, C. Li, N. Chen, K. K. Tsia, and K. K. Y. Wong, "High-speed wavelength-swept source at 2.0 μm and its application in imaging through a scattering medium," Optics Letters 42, 1540 (2017).

[7] M. Janeczek, J. Świderski, A. Czerski, B. Żywicka, J. Bujok, M. Szymonowicz, E. Bilewicz, M. Dobrzyński, M. Korczyński, A. Chrószcz, and Z. Rybak, "Preliminary Evaluation of Thulium Doped Fiber Laser in Pig Model of Liver Surgery," BioMed Research International 2018, 1-7 (2018).

[8] C. Li, J. Shi, X. Wang, B. Wang, X. Gong, L. Song, and K. K. Y. Wong, "High-energy all-fiber gain-switched thulium-doped fiber laser for volumetric photoacoustic imaging of lipids," Photonics Research 8, 160 (2020).

[9] Z. Li, S. U. Alam, Y. Jung, A. M. Heidt, and D. J. Richardson, "All-fiber, ultra-wideband tunable laser at 2 μm," Optics Letters 38, 4739 (2013).

[10] C. Li, N. Chen, X. Wei, J. Kang, B. Li, S. Tan, L. Song, and K. K. Y. Wong, "High-power widely tunable all-fiber thulium-assisted optical parametric oscillator at SWIR band," Optics Letters 41, 5258 (2016).

[11] J. Hui, Q. Yu, T. Ma, P. Wang, Y. Cao, R. S. Bruning, Y. Qu, Z. Chen, Q. Zhou, M. Sturek, J.-X. Cheng, and W. Chen, "High-speed intravascular photoacoustic imaging at 17 μm with a KTP-based OPO," Biomedical Optics Express 6, 4557 (2015).

[12] P. Wang, H.-W. Wang, M. Sturek, and J.-X. Cheng, "Bond-selective imaging of deep tissue through the optical window between 1600 and 1850 nm," Journal of Biophotonics 5, 25-32 (2012).

[13] H.-W. Wang, N. Chai, P. Wang, S. Hu, W. Dou, D. Umulis, L. V. Wang, M. Sturek, R. Lucht, and J.-X. Cheng, "Label-free bond-selective imaging by listening to vibrationally excited molecules." Physical Review Letters 106, (2011)

[14] Y. Li, X. Gong, C. Liu, R. Lin, W. Hau, X. Bai, and L. Song, "High-speed intravascular spectroscopic photoacoustic imaging at 1000 A-lines per second with a 0.9-mm diameter catheter," Journal of Biomedical Optics 20, 1 (2015).

[15] P. Wang, P. Wang, H.-W. Wang, and J.-X. Cheng, "Mapping lipid and collagen by multispectral photoacoustic imaging of chemical bond vibration," Journal of Biomedical Optics 17, 0960101 (2012).

[16] P. Wang, J. R. Rajian, and J.-X. Cheng, "Spectroscopic imaging of deep tissue through photoacoustic detection of molecular vibration," The Journal of Physical Chemistry Letters 4, 2177-2185 (2013).

[17] P. Wang, T. Ma, M. N. Slipchenko, S. Liang, J. Hui, K. K. Shung, S. Roy, M. Sturek, Q. Zhou, Z. Chen, and J.-X. Cheng, "High-speed intravascular photoacoustic imaging of lipid-laden atherosclerotic plaque enabled by a 2-kHz barium nitrite raman laser," Scientific Reports 4, (2014).

[18] J. R. Rajian, R. Li, P. Wang, and J.-X. Cheng, "Vibrational Photoacoustic Tomography: Chemical Imaging beyond the Ballistic Regime," The Journal of Physical Chemistry Letters 4, 3211-3215 (2013).

[19] R. Li, P. Wang, L. Lan, F. P. Lloyd, C. J. Goergen, S. Chen, and J.-X. Cheng, "Assessing breast tumor margin by multispectral photoacoustic tomography," Biomedical Optics Express 6, 1273 (2015).

[20] R. Li, E. Phillips, P. Wang, C. J. Goergen, and J.-X. Cheng, "Label-free in vivo imaging of peripheral nerve by multispectral photoacoustic tomography," Journal of Biophotonics 9, 124-128 (2016).

[21] M. Diem, A. Mazur, K. Lenau, J. Schubert, B. Bird, M. Miljković, C. Krafft, and J. Popp, "Molecular pathology via IR and Raman spectral imaging," Journal of Biophotonics 6, 855-886 (2013).

[22] D. Zhang, C. Li, C. Zhang, M. N. Slipchenko, G. Eakins, and J.-X. Cheng, "Depth-resolved mid-infrared photothermal imaging of living cells and organisms with submicrometer spatial resolution," Science Advances 2, (2016).

[23] C. Zhang and J.-X. Cheng, "Perspective: coherent raman scattering microscopy, the future is bright." APL Photonics 3, 090901 (2018)

[24] M. A. Pleitez, A. A. Khan, A. Solda, A. Chmyrov, J. Reber, F. Gasparin, M. R. Seeger, B. Schatz, S. Herzig, M. Scheideler, and V. Ntziachristos, "Label-free metabolic imaging by mid-infrared optoacoustic microscopy in living cells," Nature Biotechnology 38, 293-296 (2020).

[25] M. Janeczek, J. Świderski, A. Czerski, B. Żywicka, J. Bujok, M. Szymonowicz, E. Bilewicz, M. Dobrzyński, M. Korczyński, A. Chrószcz, and Z. Rybak, "Preliminary Evaluation of Thulium Doped Fiber Laser in Pig Model of Liver Surgery," BioMed Research International 2018, 1-7 (2018).

[26] D. C. Kirsch, S. Chen, R. Sidharthan, Y. Chen, S. Yoo, and M. Chernysheva, "Short-wave IR ultrafast fiber laser systems: Current challenges and prospective applications," Journal of Applied Physics 128, 180906 (2020).

[27] S. L. Jacques, "Optical properties of biological tissues: a review," Physics in Medicine and Biology 58, (2013).

[28] C. Yang, Y. Bi, E. Cai, Y. Chen, S. Huang, Z. Zhang, and P. Wang, "Pulse-sheet chemical tomography by counter-propagating stimulated Raman scattering," Optica 8, 396 (2021).

[29] L. L. Randeberg and J. Hernandez-Palacios, "Hyperspectral imaging of bruises in the SWIR spectral region," Photonic Therapeutics and Diagnostics VIII (2012).

[30] T. Bruns, T. S. Bischof, D. K. Harris, D. Franke. Y. Shi, L. Riedemann, A. Bartelt, F. B. Jaworski, J. A. Carr, C. J. Rowlands, M. W. B. Wilson, O. Chen, H. Wei, G. W. Hwang, D. M. Montana, I. Coropceanu, O. B. Achorn, J. Kloepper, J. Heeren, P. T. C. So, D. Fukumura, K. F. Jensen, R. K. Jain and M. G. Bawendi, "Next-generation in vivo optical imaging with short-wave infrared quantum dots." Nat. Biomed. Eng. 1, 0056 (2017)

[31] H. Akbari, Y. Kosugi, K. Kojima, and N. Tanaka, "Detection and Analysis of the Intestinal Ischemia Using Visible and Invisible Hyperspectral Imaging," IEEE Transactions on Biomedical Engineering 57, 2011-2017 (2010).

[32] Y. Zhao, A. Pilvar, A. Tank, H. Peterson, J. Jiang, J. C. Aster, J. P. Dumas, M. C. Pierce, and D. Roblyer, "Short-wave-infrared meso-patterned imaging enables label-free mapping of tissue water and lipid content," Nature Communications 11, (2020).

[33] M. Li, J. Shi, C. C. Y. Yiu, C. Li, K. K. Y. Wong, and L. Wang, "Near-infrared double-illumination optical-resolution photoacoustic microscopy," Journal of Biophotonics 14, (2020).

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An optical-resolution photoacoustic microscopy (OR-PAM) system for visualizing water content in the deep tissue of biological organisms, comprising as an input an all-fiber hybrid optical parametrically-oscillating emitter operating in a range from 1877 nm to 1980 nm, wherein the hybrid structure uses nonlinear fibers with stable phase matching and rare-earth fibers.

2. The system of claim 1 wherein the all-fiber hybrid optical parametrically-oscillating emitter comprises:
   a tunable laser source (TLD) generating a laser beam;
   a first erbium-doped fiber amplifier (EDFA1) that receives the laser beam and amplifies it;
   a Mach-Zehnder amplitude modulator (AM) that receives the amplified laser beam and generates a rectangular pulse train therefrom, said modulator being driven by a radio frequency signal with a certain nanosecond pulse width and a particular kilohertz repetition rate, wherein tuning a polarization state of the laser with a polarization controller causes a four-wave mixing process that converts the pump energy to a narrowband idler at a wavelength from 1800 nm to 2000 nm with the pump wavelength tuned from 1541 nm to 1563 nm;
   a second erbium-doped fiber amplifier (EDFA2) that receives the rectangular pulse train and boosts the average power thereof;
   a fiber circulator (CIR1) that receives the boosted pulse train and passes it to a nm fiber wavelength-division-multiplexing coupler (WDM);
   a cavity that receives the boosted pulse train from the coupler, said cavity including a spool of multiple meters of highly nonlinear fiber with stable phase-matching so as to improve nonlinear efficiency (HNLF-SPINE, OFS), which acts as the parametric gain medium in the cavity, and a 1-m Thulium-doped fiber that amplifies (first TDFA) the idler and in which the residual pump in the 1550-nm band is further depleted for boosting the idler power to enhance the cavity gain;
   a 50/50 fiber coupler connected to the first TDFA so that one stream of the laser signal is output from the cavity and another stream containing the idler is guided back to the input of the cavity through a multiple meter spool of single-mode fiber (SMF) to increase the cavity length, the idler being input to the cavity via an port of the WDM; and
   a second TDFA 2 that receives the output for the cavity and provides an extra power pumping at 1650 nm and the output of the emitter.

3. The system of claim 2 further including a tunable bandpass filter with a 1-nm spectral bandwidth located between the modulator and the second EDFA2 so as to filter out undesired amplified spontaneous emission (ASE).

4. The system of claim 2 wherein the radio frequency pulse width is 15 ns and the repetition rate is 50 kHz, the cavity spool of HNLF-SPINE is about 50 meters and the spool of SMF is about 200 meters, the first EDFA1 amplifies the laser beam to about 10 mW and the second EDFA2 boosts the average power to 2-W with a peak of 2.67 kW.

5. The system of claim 1 wherein the OR-PAM) system further comprises:
   a collimator for receiving the output light beam of the emitter and expanding it;
   an objective lens for receiving the expanded light beam and focusing it;
   a sample in a water tank upon which the focused light is directed to excite photoacoustic signals;
   an ultrasonic transducer collects photoacoustic waves from the sample at the same location where the focused light beam engages it and converts it to electrical signals;
   an RF amplifier for increasing the magnitude of the electrical signals;
   a digital converter that converts the electrical signals into digital signals and displaying them so as to show the water content in the deep tissue of biological organisms.

6. The system of claim 5 further including an X-Y-Z translational stage holding the sample water tank so as to be able to move the sample in the focused beam and conduct raster-scanning of the sample.

7. The system of claim 5 wherein the focused beam is directed to the sample through an optical window.

8. The system of claim 5 wherein the RF amplifier is two cascaded RF low-noise amplifiers.

9. The system of claim 5 further including a low-pass filter between the an RF amplifier and the digital converter.

10. The system of claim 5 wherein the digital converter is an oscilloscope.

11. The system of claim 10 wherein the PA signal has its center frequency at 10 MHz, the sampling rate of the oscilloscope is set to 100 MHz and the sampling length is selected to be 500 for a 5-µs time window.

12. The system of claim 5 wherein the digital converter is a data acquisition card and a personal computer.

13. An all-fiber hybrid optical parametrically-oscillating emitter comprising:
   a tunable laser source (TLD) generating a laser beam;
   a first erbium-doped fiber amplifier (EDFA1) that receives the laser beam and amplifies it;
   a Mach-Zehnder amplitude modulator (AM) that receives the amplified laser beam and generates a rectangular pulse train therefrom, said modulator being driven by a radio frequency signal with a certain nanosecond pulse width and a particular kilohertz repetition rate, wherein tuning a polarization state of the laser with a polarization controller causes a four-wave mixing process that converts the pump energy to a narrowband idler at a wavelength from 1800 nm to 2000 nm with the pump wavelength tuned from 1541 nm to 1563 nm;
   a second erbium-doped fiber amplifier (EDFA2) that receives the rectangular pulse train and boosts the average power thereof to about 2 W with a peak of about 2.67 kW;
   a fiber circulator (CIR1) receives the boosted pulse train and passes it to a fiber wavelength-division-multiplexing coupler (WDM);
   a cavity that receives the boosted pulse train from the coupler, wherein the cavity includes a spool of multiple meters of highly nonlinear fiber with stable phase-matching so as to improve nonlinear efficiency (HNLF-SPINE, OFS), which acts as the parametric gain medium in the cavity, and a 1-m Thulium-doped fiber that amplifies (first TDFA) the idler and in which the residual pump in the 1550-nm band is further depleted for boosting the idler power to enhance the cavity gain;
   a 50/50 fiber coupler connected to the first TDFA so that one stream of the laser signal is output from the cavity and another stream containing the idler is guided back to the input of the cavity through a spool of further multiple meters of single-mode fiber (SMF) to increase the cavity length, the idler being input to the cavity via an input port of WDM; and a second TDFA 2 that receives the output from the cavity and provides an extra power pumping at 1650 nm as the output of the emitter.

14. The all-fiber hybrid optical parametrically-oscillating emitter of claim 13 wherein the radio frequency pulse width is 15 ns and the repetition rate is 50 kHz, the cavity spool of HNLF-SPINE is about 50 meters and the spool of SMF is about 200 meters, the first EDFA1 amplifies the laser beam to about 10 mW and the second EDFA2 boosts the average power to 2-W with a peak of 2.67 kW.

15. The all-fiber hybrid optical parametrically-oscillating emitter of claim 13 further including a tunable bandpass filter with a 1-nm spectral bandwidth located between the modulator and the second EDFA2 so as to filter out undesired amplified spontaneous emission (ASE).

16. The all-fiber hybrid optical parametrically-oscillating emitter of claim 13 operating in a range from 1900 nm to 2000 nm.

17. The all-fiber hybrid optical parametrically-oscillating emitter according to claim 16 wherein fiber wavelength-division-multiplexing coupler (WDM) is a 1950/1550 multiplexing coupler and the input to cavity is a 1950 nm input and the emitter operates at 1930 nm.

* * * * *